Oct. 18, 1949.　　　　　A. REPAS　　　　　2,485,166
DEVICE FOR APPLYING ELASTIC
GASKETS TO DISK MEMBERS

Filed April 12, 1947　　　　　　　　　　2 Sheets-Sheet 1

INVENTOR.
ANDREW REPAS.

BY Ward, Crosby & [illegible]

ATTORNEYS.

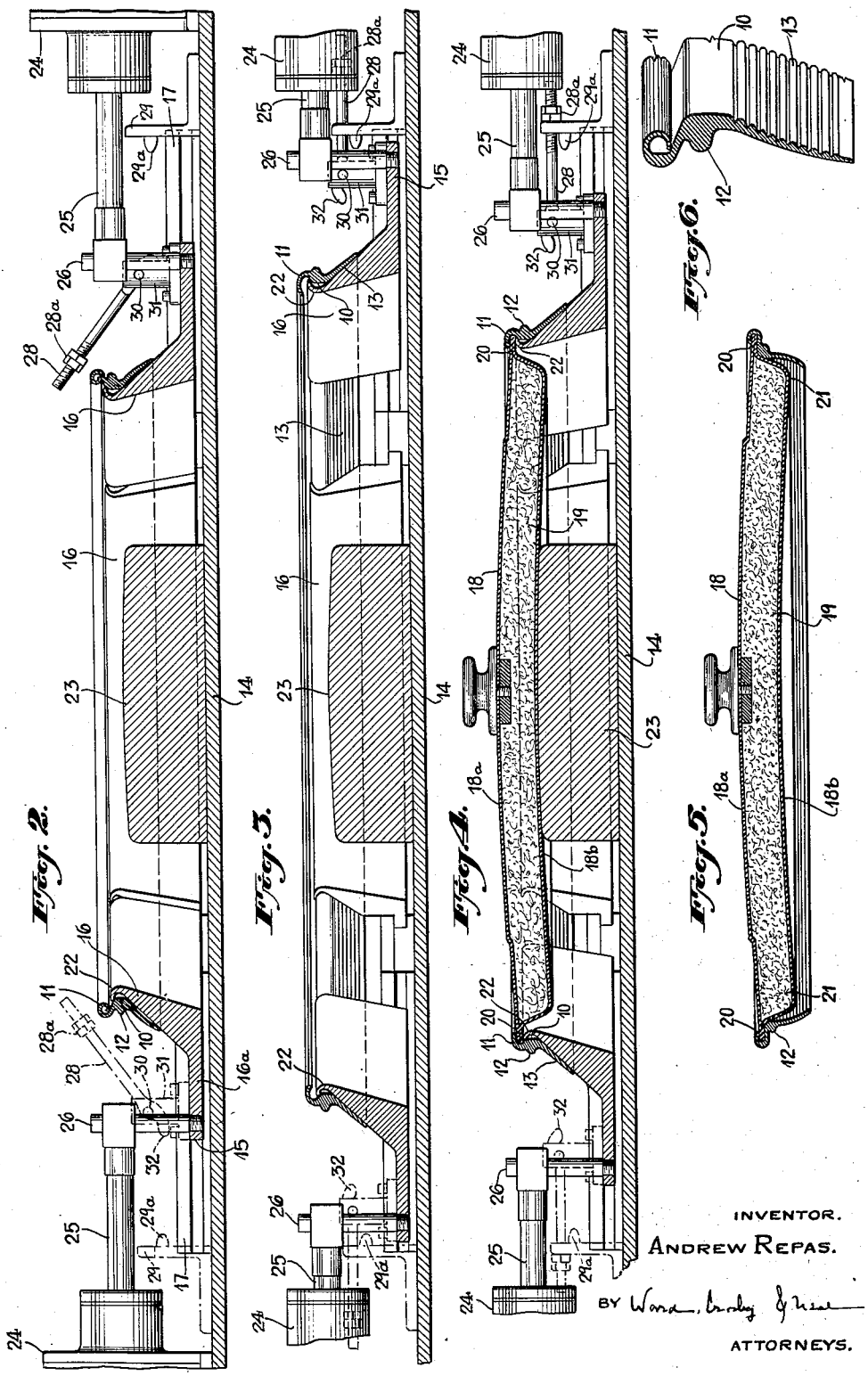

Patented Oct. 18, 1949

2,485,166

UNITED STATES PATENT OFFICE 2,485,166

DEVICE FOR APPLYING ELASTIC GASKETS TO DISK MEMBERS

Andrew Repas, Allentown, N. J., assignor to St. Regis Paper Company, New York, N. Y., a corporation of New York Application April 12, 1947, Serial No. 741,135

1 Claim. (Cl. 29—235)

This invention relates to means for uniformly stretching elastic belt members, and more particularly to devices for applying elastic gaskets to the margins of disc members.

It is highly desirable for the lid members or covers for such units as refrigerators to have elastic gasket members surrounding the peripheries thereof. Such gaskets preferably are of the type which very tightly adhere to the lid or covering by virtue of the elasticity thereof and which preferably are of such contour that a lip thereof engages a peripheral flange of the lid.

Such gasket members normally must be fabricated from heavy elastic sheet material and must be of sufficient quality and dimensions to resist wear over long periods under conditions of sharp temperature variations, and also they must be resistant to elastic fatigue. It will be understood that gaskets of this variety are difficult to stretch manually and are tedious if not impossible to install rapidly by hand upon said lids or coverings.

No satisfactory apparatus has heretofore been devised for rapidly and properly applying gaskets of the above character to disc members such as refrigerator lids.

Furthermore, no means have been heretofore suggested for uniformly stretching at a proper rate an elastic gasket of the above type whereby elastic lip portions thereof are expanded and opened to receive a disc member properly.

Also, devices of this type in the past have been unnecessarily complicated and expensive and have required highly skilled workers to operate same.

According to the present invention apparatus is provided for overcoming the above difficulties.

Various further and more specific features and advantages of the invention will clearly appear from the detailed description given below taken in connection with the accompanying drawings which form a part of this specification and illustrate, by way of example, preferred arrangements of apparatus for carrying out the invention. The latter consists in such novel combinations of features and apparatus as may be shown and described in connection with equipment herein disclosed.

In the drawings:

Fig. 2 is a detailed side view partly in section showing a plit expansible ring in its initial operating position;

Fig. 3 is similar to Fig. 2 but with the parts of said ring in a different operating position;

Fig. 4 is a view of the parts shown in Fig. 3 in another operating position;

Fig. 5 is a sectional view of a lid or cover member to which an elastic gasket is applied; and Fig. 6 is a sectional view of a gasket which is to be applied to said cover.

Figure 1:
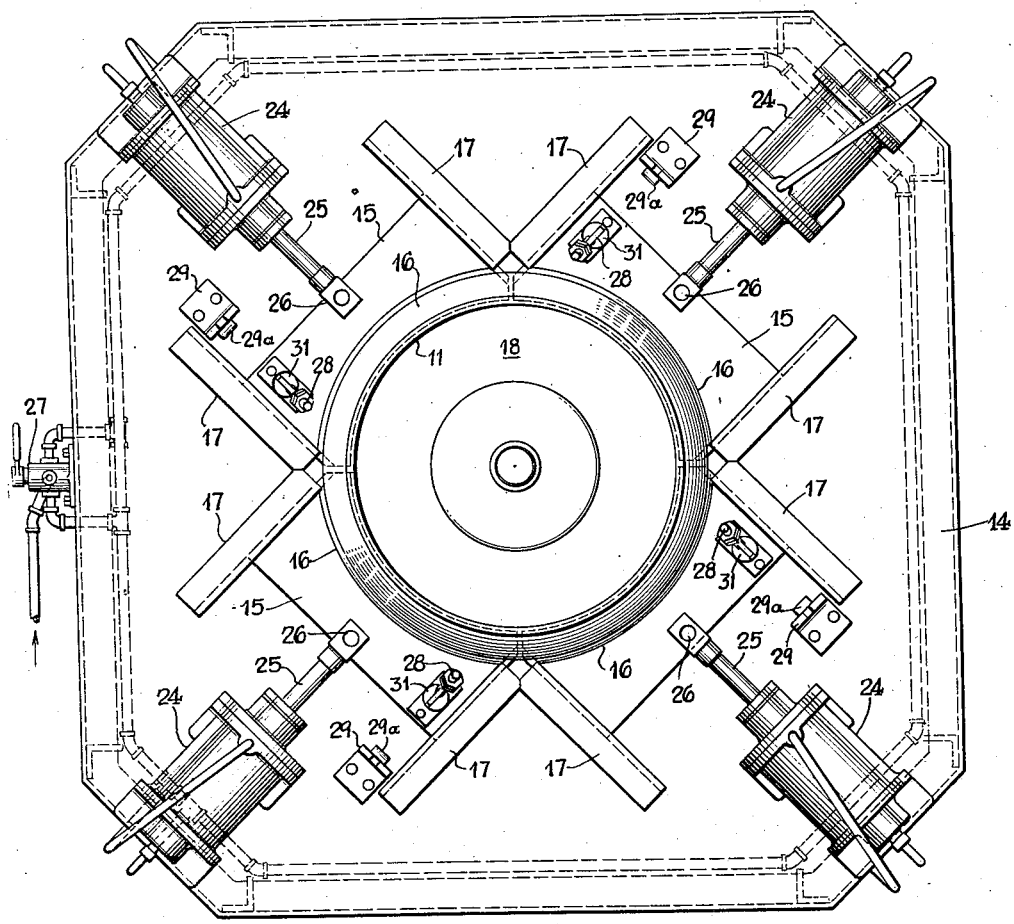
Fig. 1 is a top plan view of one embodiment of the invention.

The novel gasket applying apparatus, in the form shown, comprises an expansible ring which is subdivided into a plurality of radially shiftable segmental members which are slidably mounted upon a table or a base and which are simultaneously shiftable radially relative to a common central or reference point. The segmental members comprising said expansible ring have provided adjacent the upper edge thereof an outwardly turned bead which cooperates with said gasket member in a novel manner to appear more fully hereinafter, whereby an annular lip of said gasket member is spread or opened for the reception of a marginal flange of the lid to which the gasket is to be applied. Novel means are provided for governing the radial movement of the segmental members whereby the extent of said movement and the rate thereof is precisely controlled in order rapidly and efficiently to apply said gaskets with little or no danger of damage to the gasket or the disc member to which it is to be applied.

Referring to the drawings in further detail, a gasket 10 which is to be applied to the disc is illustrated in cross section in Fig. 6 and preferably comprises a belt having a lip 11 which, as shown in said figure, is rolled inwardly forming an inwardly turned bead at the upper margin of said gasket. The rolled lip 11 as shown in Fig. 6 is hollow. The gasket 10 comprises in general a belt shaped elastic member having preferably an annular or solid bead 12 immediately below said lip which acts as a supporting surface for the lid. A portion 13 of said belt is so constructed and arranged that it will hug the periphery of a refrigerator lid as shown in Fig. 5 and will extend below same thereby forming, as viewed in Fig. 5, a downwardly and inwardly extending elastic flange.

The apparatus for stretching and applying said gasket 10, as shown in Fig. 1, comprises a base or table member 14 upon which is mounted the above mentioned expansible ring 15 which is constituted by a plurality of radially shiftable segmental members 16. In the form shown, four such segmental members are illustrated which are of equal angular extent which, as shown in Figs.

1 and 2, are in the form of a frustrum of a cone, the slanting sides of which are adapted for supporting the gasket 10 in a manner to appear hereinafter. Each segmental member 16 is provided with a slidable base or foot member 16a (Fig. 2) which is adapted for resting upon said table 14 and being moved slidably thereupon. Each of said segmental members 16 is guided in its radial movement by means of suitable guide members as at 17.

A lid 18 to which the gasket is to be applied is illustrated in Fig. 5 and is constituted by, for example, a pair of disc members 18a and 18b having interposed therebetween suitable insulation 19. The lid 18 in the form shown is circular in contour and is provided at the margin thereof with a flange 20 which overhangs a peripheral surface 21 thereof.

It is desirable for the gasket 10 to hug closely adjacent the peripheral surface 21 as shown in Fig. 5 and also to surround a portion of the flange 20 including the periphery thereof. To this end, the belt or gasket member 10 is formed as shown in Fig. 6 with the inwardly rolled lip 11 curled fully inwardly when the belt or gasket member is in an unstretched condition.

Novel means are provided upon the expansible ring for unrolling or opening said lip member 11 whereby it will be adapted to receive the flange 20 and to engage same as shown in Fig. 5. Said novel means comprise an outwardly turned bead 22 upon the upper edge of the expansible ring or upon the upper edge of the segmental members 16 which comprise said ring. The bead 22 cooperates with the lip 11 in a manner to be explained hereinafter.

In order to support the cover or lid 18 in the proper position relative to the segmental members 16 and a gasket thereupon, a support 23 is provided which is disposed centrally of said segmental members and is adapted for supporting the lid 18 whereby the periphery thereof will be properly positioned to receive the gasket 10. For example, the flange 20 will be positioned to receive the unrolled or expanded lip 11 as shown in Fig. 4.

The segmental members 16, initially are in the position indicated in Figs. 1 and 2 which is referred to as a primary or unexpanded position. In the latter condition the gasket 10 may be manually placed thereupon as shown in Fig. 2 whereby the outwardly turned bead 22 engages that portion of the belt 10 which is immediately beneath the inwardly rolled lip 11.

Means are provided for radially shifting said segmental members at a uniform rate from said primary position as shown in Fig. 2 to an expanded or secondary position as shown in Fig. 3 comprising power cylinders 24 which preferably are equal in number to the number of segmental members 16, there being thus one power cylinder for each segmental member. Each power cylinder 24 is adapted for communicating a radial thrust to its corresponding segmental member through the intermediary of the piston rod 25, and for example, a finger 26 which is rigidly secured to the portion 16a of its corresponding segmental member. The power cylinders 24 may be actuated by any suitable pressure medium such as air which may be led thereto in a well known manner through suitable conduits. The power cylinders 24 are actuated by a pressure medium from a common source (not shown) and are adapted for simultaneous uniform movement as controlled by a hand valve 27 (Fig. 1).

As above mentioned the segmental members 16 are in their primary or initial position as shown in Fig. 2. As shown in Fig. 3 said segmental members are in their secondary or expanded position wherein the belt member 10 is fully expanded and is in condition for receiving the disc 18. In Fig. 4 said members are in a tertiary or third position which is intermediate the first two positions and is disposed relative to said reference point whereby the belt or gasket 10 is engaged by the disc 18 and said disc may be lifted or withdrawn from the apparatus with the gasket member applied thereto. Novel means are provided for arresting the inward radial movement of the segmental members from the secondary to the tertiary positions, that is, limit-stop means are provided which arrests said inward radial movement precisely at the tertiary position. Said novel means in the form shown are constituted by an angularly shiftable arm 28, one of said arms being associated with each of said segmental members 16. The arm 28 is held in an inactive position until after the segmental members have reached their secondary positions at which time it is angularly shifted from its normally inactive position as shown in Fig. 2 to its active position as shown in Figs. 3 and 4. In the latter position an axially shiftable bolt 28a is adapted for engaging a yoke member 29 and thus for restricting the range of inward radial movement whereby said segmental members will be able to move from the secondary positions to their tertiary positions and to be precisely arrested at the latter.

The angularly shiftable limit-stop arms 28 are pivotally mounted upon their respective segmental members at 30, the latter preferably being supported by a bracket 31. Means for automatically shifting the arms 28 from their position as shown in Fig. 2 to their position as shown in Fig. 3 in response to outward radial movement, may be provided comprising a lug 32 (Fig. 2) which may be integral with the arm 28 and which may strike a cooperating lug 29a upon the yoke 29 in response to movement to said secondary position. Thus the arms 28 will be quickly snapped or moved to their active positions as shown in Figs. 3 and 4.

In operation, when it is desired to apply a gasket 10 to a lid 18, the arms 28 are moved to their inactive positions as shown in Figs. 1 and 2 and the valve 27 is actuated to shift the segmental members 16 to their primary positions as shown in said Figs. 1 and 2. At this point the gasket 10 may be manually inserted over the expansible ring with the inwardly rolled lip 11 immediately above the outwardly curled bead 22. In this position the bead is rolled inwardly as shown in Figs. 2 and 6. The insertion of the gasket 10 over the expansible ring may be easily performed manually when the ring is in its primary position. Thereafter the valve 27 is actuated whereby the power cylinders 24 exert an outward radial thrust simultaneously and move the segmental members 16 from their unexpanded position to their secondary position as shown in Fig. 2 whereby the inwardly curled lip 11 is opened up as illustrated in Fig. 3 thus permitting the engagement of said lip 11 with the peripheral flange 20 of the lid 18. After the segmental members have reached their secondary position as shown in Fig. 3 the lid 18 is placed upon the table 23 and the angularly shiftable limit-stop arms are moved from their inactive position as shown in Fig. 2 to their active position as shown in Figs. 3 and 4 and the direction of radial movement of the segmental members is reversed by means of the control valve 27. Said members thus are shifted to the tertiary position as shown in Fig. 4 and the lip 11 engages the flange 20 (Fig. 4) whereby the lid may be withdrawn from the apparatus with the gasket 10 attached thereto as shown in Fig. 5. The frusto-conical contour of the expansible ring makes possible a prompt and easy withdrawal of the belt member therefrom when the lid 18 is lifted after the lip 11 has engaged the flange 20 as shown in Fig. 4.

While the invention has been described with respect to a certain preferred example which has given satisfactory results, it will be understood by those skilled in the art after understanding the invention that various changes and modifications may be made without departing from the spirit and scope of the invention, and it is intended, therefore, in the appended claim, to cover all such changes and modifications.

What is claimed is:

In apparatus of the class described, a table member, a split expansible ring comprising a plurality of segments radially shiftable relative to a center point upon said table, said expansible ring being in the form of a frustum of a cone with an outwardly turned bead on the upper edge thereof for facilitating the spreading of a gasket lip, power means for radially shifting said segments outwardly whereby an elastic gasket placed thereon is enlarged in diameter for the insertion of a disc member, and limit stop means rendered operative in response to said outward radial movement for limiting the inward return radial movement of said segments by a predetermined amount.

ANDREW REPAS.

REFERENCES CITED

The following references are of record in the file of this patent:

UNITED STATES PATENTS

| Number    | Name      | Date          |
|-----------|-----------|---------------|
| 805,868   | Marshal   | Nov. 28, 1905 |
| 1,246,557 | Crowder   | Nov. 13, 1917 |
| 2,086,371 | Tear      | July 6, 1937  |
| 2,253,713 | Lancaster | Apr. 26, 1941 |
| 2,422,065 | Anselmi   | June 10, 1947 |